US008266213B2

(12) United States Patent
Crowder

(10) Patent No.: US 8,266,213 B2
(45) Date of Patent: Sep. 11, 2012

(54) APPARATUS, METHOD, AND SYSTEM TO PROVIDE A MULTIPLE PROCESSOR ARCHITECTURE FOR SERVER-BASED GAMING

(75) Inventor: Robert W. Crowder, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 652 days.

(21) Appl. No.: 12/271,736

(22) Filed: Nov. 14, 2008

(65) Prior Publication Data

US 2010/0124990 A1 May 20, 2010

(51) Int. Cl.
*G06F 15/16* (2006.01)

(52) U.S. Cl. ........ 709/205; 709/203; 709/217; 709/223; 463/31

(58) Field of Classification Search .................. 709/209, 709/205, 203, 217, 223; 463/25, 31
See application file for complete search history.

(56) References Cited

U.S. PATENT DOCUMENTS 4,339,798 A 7/1982 Hedges et al. ................ 364/412
4,373,726 A 2/1983 Churchill et al. ......... 273/138 A
4,592,377 A 6/1986 Paulsen et al. ................ 133/5 R
4,725,079 A 2/1988 Koza et al. ....................... 283/73
4,832,341 A 5/1989 Muller et al. ................. 273/139
4,948,138 A 8/1990 Pease et al. ............... 273/138 A
5,083,800 A 1/1992 Lockton ........................ 273/439
5,179,517 A 1/1993 Sarbin et al. .................. 364/410
5,199,710 A 4/1993 Lamle ....................... 273/149 R
5,258,837 A 11/1993 Gormley ....................... 358/140
5,275,400 A 1/1994 Weingardt et al. ........ 273/85 CP
5,321,241 A 6/1994 Craine .......................... 235/380
5,324,035 A 6/1994 Morris et al. ............. 273/138 A
5,326,104 A 7/1994 Pease et al. ............... 273/138 A
5,386,103 A 1/1995 DeBan et al. ................. 235/379
5,398,932 A 3/1995 Eberhardt et al. ........ 273/138 A
5,472,194 A 12/1995 Breeding et al. .......... 273/138 A
5,493,613 A 2/1996 Denno et al. .................... 380/24
5,505,449 A 4/1996 Eberhardt et al. ........ 273/138 A
5,507,489 A 4/1996 Reibel et al. .............. 273/138 A (Continued)

FOREIGN PATENT DOCUMENTS

DE 19940954 A1 3/2001

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Ramy M Osman
(74) *Attorney, Agent, or Firm* — Seed IP Law Group PLLC

(57) ABSTRACT

An architecture for an electronic gaming machine (EGM) includes multiple processors that separate game logic from game presentation. The multi-processor architecture includes a dedicated game logic engine and a dedicated presentation engine. A first processor having the game logic engine is adapted to handle the input/output (I/O), peripherals, communications, accounting, critical gaming and other game logic, power hit tolerances, protocols to other systems, and other tasks related to operation of the EGM. A second processor is adapted to running a presentation engine. The second processor receives commands from the first processor to present game-oriented outcome and results.

12 Claims, 5 Drawing Sheets

U.S. PATENT DOCUMENTS

| | | | | |
|---|---|---|---|---|
| 5,562,284 | A | 10/1996 | Stevens | 273/139 |
| 5,580,311 | A | 12/1996 | Haste, III | 463/29 |
| 5,605,334 | A | 2/1997 | McCrea, Jr. | 273/309 |
| 5,605,506 | A | 2/1997 | Hoorn et al. | 463/47 |
| 5,613,680 | A | 3/1997 | Groves et al. | 273/138.2 |
| 5,613,912 | A | 3/1997 | Slater | 463/25 |
| 5,643,086 | A | 7/1997 | Alcorn et al. | 463/29 |
| 5,655,961 | A | 8/1997 | Acres et al. | 463/27 |
| 5,707,287 | A | 1/1998 | McCrea, Jr. | 463/27 |
| 5,737,418 | A | 4/1998 | Saffari et al. | 380/9 |
| 5,741,183 | A | 4/1998 | Acres et al. | 463/42 |
| 5,745,110 | A | 4/1998 | Ertemalp | 345/340 |
| 5,759,102 | A | 6/1998 | Pease et al. | 463/42 |
| 5,770,533 | A | 6/1998 | Franchi | 463/42 |
| 5,779,545 | A | 7/1998 | Berg et al. | 463/22 |
| 5,800,268 | A | 9/1998 | Molnick | 463/40 |
| 5,813,912 | A | 9/1998 | Shultz | 463/25 |
| 5,823,534 | A | 10/1998 | Banyai | 273/269 |
| 5,823,879 | A | 10/1998 | Goldberg et al. | 463/42 |
| 5,830,067 | A | 11/1998 | Graves et al. | 463/40 |
| 5,830,068 | A | 11/1998 | Brenner et al. | 463/42 |
| 5,850,447 | A | 12/1998 | Peyret | 380/25 |
| 5,851,149 | A | 12/1998 | Xidos et al. | 463/42 |
| 5,890,963 | A | 4/1999 | Yen | 463/42 |
| 5,911,626 | A | 6/1999 | McCrea, Jr. | 463/27 |
| 5,957,776 | A | 9/1999 | Hoehne | 463/25 |
| 5,971,851 | A | 10/1999 | Pascal et al. | 463/24 |
| 5,999,808 | A | 12/1999 | LaDue | 455/412 |
| 6,001,016 | A | 12/1999 | Walker et al. | 463/42 |
| 6,042,150 | A | 3/2000 | Daley | 283/86 |
| 6,068,553 | A | 5/2000 | Parker | 463/27 |
| 6,077,161 | A | 6/2000 | Wisler | 463/11 |
| 6,080,063 | A | 6/2000 | Khosla | 463/42 |
| 6,089,980 | A | 7/2000 | Gauselmann | 463/27 |
| 6,093,103 | A | 7/2000 | McCrea, Jr. | 463/27 |
| 6,102,799 | A | 8/2000 | Stupak | 463/27 |
| 6,104,815 | A | 8/2000 | Alcorn et al. | 380/251 |
| 6,106,396 | A | 8/2000 | Alcorn et al. | 463/29 |
| 6,110,041 | A | 8/2000 | Walker et al. | 463/20 |
| 6,110,043 | A | 8/2000 | Olsen | 463/27 |
| 6,117,012 | A | 9/2000 | McCrea, Jr. | 463/27 |
| 6,135,887 | A | 10/2000 | Pease et al. | 463/42 |
| 6,146,273 | A | 11/2000 | Olsen | 463/27 |
| 6,149,522 | A | 11/2000 | Alcorn et al. | 463/29 |
| 6,152,824 | A | 11/2000 | Rothschild et al. | 463/42 |
| 6,165,069 | A | 12/2000 | Sines et al. | 463/12 |
| 6,166,763 | A | 12/2000 | Rhodes et al. | 348/143 |
| 6,168,523 | B1 | 1/2001 | Piechowiak et al. | 463/26 |
| 6,183,366 | B1 | 2/2001 | Goldberg et al. | 463/42 |
| 6,186,892 | B1 | 2/2001 | Frank et al. | 463/19 |
| 6,210,277 | B1 | 4/2001 | Stefan | 463/27 |
| 6,217,447 | B1 | 4/2001 | Lofink et al. | 463/12 |
| 6,219,836 | B1 | 4/2001 | Wells et al. | 717/11 |
| 6,234,898 | B1 | 5/2001 | Belamant et al. | 463/25 |
| 6,244,958 | B1 | 6/2001 | Acres | 463/26 |
| 6,251,014 | B1 | 6/2001 | Stockdale et al. | 463/16 |
| 6,254,484 | B1 | 7/2001 | McCrea, Jr. | 463/27 |
| 6,264,561 | B1 | 7/2001 | Saffari et al. | 463/42 |
| 6,275,586 | B1 | 8/2001 | Kelly | 380/46 |
| 6,287,202 | B1 | 9/2001 | Pascal et al. | 463/42 |
| 6,346,044 | B1 | 2/2002 | McCrea, Jr. | 463/27 |
| 6,383,076 | B1 | 5/2002 | Tiedeken | 463/40 |
| 6,394,900 | B1 | 5/2002 | McGlone et al. | 463/20 |
| 6,400,272 | B1 | 6/2002 | Holtzman et al. | 340/572.1 |
| 6,409,602 | B1 | 6/2002 | Wiltshire et al. | 463/42 |
| 6,439,996 | B2 | 8/2002 | LeMay et al. | 463/29 |
| 6,443,839 | B2 | 9/2002 | Stockdale et al. | 463/16 |
| 6,460,848 | B1 | 10/2002 | Soltys et al. | 273/149 R |
| 6,464,584 | B2 | 10/2002 | Oliver | 463/25 |
| 6,488,581 | B1 | 12/2002 | Stockdale | 463/29 |
| 6,488,585 | B1 | 12/2002 | Wells et al. | 463/43 |
| 6,503,147 | B1 | 1/2003 | Stockdale et al. | 463/29 |
| 6,505,772 | B1 | 1/2003 | Mollett et al. | 235/379 |
| 6,508,709 | B1 | 1/2003 | Karmarkar | 463/42 |
| 6,508,710 | B1 | 1/2003 | Paravia et al. | 463/42 |
| 6,517,435 | B2 | 2/2003 | Soltys et al. | 463/25 |
| 6,517,436 | B2 | 2/2003 | Soltys et al. | 463/29 |
| 6,520,857 | B2 | 2/2003 | Soltys et al. | 463/29 |
| 6,527,271 | B2 | 3/2003 | Soltys et al. | 273/148 R |
| 6,527,638 | B1 | 3/2003 | Walker et al. | 463/25 |
| 6,530,836 | B2 | 3/2003 | Soltys et al. | 463/29 |
| 6,530,837 | B2 | 3/2003 | Soltys et al. | 463/29 |
| 6,533,276 | B2 | 3/2003 | Soltys et al. | 273/148 R |
| 6,533,662 | B2 | 3/2003 | Soltys et al. | 463/25 |
| 6,575,833 | B1 | 6/2003 | Stockdale | 463/29 |
| 6,578,847 | B1 | 6/2003 | Hedrick et al. | 273/138.2 |
| 6,579,180 | B2 | 6/2003 | Soltys et al. | 463/25 |
| 6,579,181 | B2 | 6/2003 | Soltys et al. | 463/25 |
| 6,581,747 | B1 | 6/2003 | Charlier et al. | 194/214 |
| 6,595,857 | B2 | 7/2003 | Soltys et al. | 463/29 |
| 6,607,441 | B1 | 8/2003 | Acres | 463/25 |
| 6,609,978 | B1 | 8/2003 | Paulsen | 463/42 |
| 6,612,928 | B1 | 9/2003 | Bradford et al. | 463/29 |
| 6,629,184 | B1 | 9/2003 | Berg et al. | 710/306 |
| 6,638,170 | B1 | 10/2003 | Crumby | 463/42 |
| 6,641,484 | B2 | 11/2003 | Oles et al. | 463/47 |
| 6,645,077 | B2 | 11/2003 | Rowe | 463/42 |
| 6,652,378 | B2 | 11/2003 | Cannon et al. | 463/20 |
| 6,656,048 | B2 | 12/2003 | Olsen | 463/25 |
| 6,663,490 | B2 | 12/2003 | Soltys et al. | 463/25 |
| 6,675,152 | B1 | 1/2004 | Prasad et al. | 705/64 |
| 6,676,522 | B2 | 1/2004 | Rowe et al. | 463/42 |
| 6,682,421 | B1 | 1/2004 | Rowe et al. | 463/25 |
| 6,682,423 | B2 | 1/2004 | Brosnan et al. | 463/29 |
| 6,685,564 | B2 | 2/2004 | Oliver | 463/25 |
| 6,685,567 | B2 | 2/2004 | Cockerille et al. | 463/43 |
| 6,688,979 | B2 | 2/2004 | Soltys et al. | 463/25 |
| 6,699,128 | B1 | 3/2004 | Beadell et al. | 463/46 |
| 6,702,291 | B2 | 3/2004 | Grebler et al. | 273/292 |
| 6,712,695 | B2 | 3/2004 | Mothwurf et al. | 463/25 |
| 6,712,696 | B2 | 3/2004 | Soltys et al. | 463/25 |
| 6,718,361 | B1 | 4/2004 | Basani et al. | 709/201 |
| 6,728,740 | B2 | 4/2004 | Kelly et al. | 708/250 |
| 6,743,102 | B1 | 6/2004 | Fiechter et al. | 463/42 |
| 6,746,330 | B2 | 6/2004 | Cannon | 463/25 |
| 6,752,312 | B1 | 6/2004 | Chamberlain et al. | 235/375 |
| 6,755,741 | B1 | 6/2004 | Rafaeli | 463/25 |
| 6,758,751 | B2 | 7/2004 | Soltys et al. | 463/29 |
| 6,800,029 | B2 | 10/2004 | Rowe et al. | 463/25 |
| 6,811,488 | B2 | 11/2004 | Paravia et al. | 463/42 |
| 6,817,948 | B2 | 11/2004 | Pascal et al. | 463/42 |
| 6,823,419 | B2 | 11/2004 | Berg et al. | 710/306 |
| 6,837,789 | B2 | 1/2005 | Garahi et al. | 463/29 |
| 6,846,238 | B2 | 1/2005 | Wells | 463/39 |
| 6,848,994 | B1 | 2/2005 | Knust et al. | 463/25 |
| 6,866,581 | B2 | 3/2005 | Martinek et al. | 463/16 |
| 6,866,586 | B2 | 3/2005 | Oberberger et al. | 463/42 |
| 6,884,173 | B2 | 4/2005 | Gauselmann | 463/42 |
| 6,884,174 | B2 | 4/2005 | Lundy et al. | 463/42 |
| 6,896,618 | B2 | 5/2005 | Benoy et al. | 463/25 |
| 6,899,627 | B2 | 5/2005 | Lam et al. | 463/40 |
| 6,905,411 | B2 | 6/2005 | Nguyen et al. | 463/25 |
| 6,908,387 | B2 | 6/2005 | Hedrick et al. | 463/31 |
| 6,962,530 | B2 | 11/2005 | Jackson | 463/29 |
| 6,971,956 | B2 | 12/2005 | Rowe et al. | 463/25 |
| 6,972,682 | B2 | 12/2005 | Lareau et al. | 340/568.1 |
| 6,993,587 | B1 | 1/2006 | Basani et al. | 709/229 |
| 6,997,803 | B2 | 2/2006 | LeMay et al. | 463/20 |
| 7,025,674 | B2 | 4/2006 | Adams et al. | 463/1 |
| 7,035,626 | B1 | 4/2006 | Luciano, Jr. | 455/414.1 |
| 7,050,056 | B2 | 5/2006 | Meyringer | 345/440 |
| 7,062,470 | B2 | 6/2006 | Prasad et al. | 705/64 |
| 7,086,947 | B2 | 8/2006 | Walker et al. | 463/25 |
| 7,099,035 | B2 | 8/2006 | Brooks et al. | 358/1.15 |
| 7,112,138 | B2 | 9/2006 | Hedrick et al. | 463/29 |
| 7,114,718 | B2 | 10/2006 | Grauzer et al. | 273/149 R |
| 7,116,782 | B2 | 10/2006 | Jackson et al. | 380/251 |
| 7,147,558 | B2 | 12/2006 | Giobbi | 463/25 |
| 7,168,089 | B2 | 1/2007 | Nguyen et al. | 726/4 |
| 7,179,170 | B2 | 2/2007 | Martinek et al. | 463/29 |
| 7,186,181 | B2 | 3/2007 | Rowe | 463/42 |
| 7,197,765 | B2 | 3/2007 | Chan et al. | 726/8 |
| 7,198,571 | B2 | 4/2007 | LeMay et al. | 463/25 |
| RE39,644 | E | 5/2007 | Alcorn et al. | 380/251 |
| 7,291,068 | B2 | 11/2007 | Bryant et al. | 463/25 |
| 7,303,475 | B2 | 12/2007 | Britt et al. | 463/42 |
| 7,309,065 | B2 | 12/2007 | Yoseloff et al. | 273/292 |

| | | | | |
|---|---|---|---|---|
| 7,311,605 | B2 | 12/2007 | Moser | 463/25 |
| 7,329,185 | B2 | 2/2008 | Conover et al. | 463/25 |
| 7,330,822 | B1 | 2/2008 | Robson et al. | 705/9 |
| 7,331,520 | B2 | 2/2008 | Silva et al. | 235/381 |
| 7,346,682 | B2 | 3/2008 | Basani et al. | 709/224 |
| 7,349,920 | B1 | 3/2008 | Feinberg et al. | 707/102 |
| 7,351,147 | B2 | 4/2008 | Stockdale et al. | 463/29 |
| 7,356,770 | B1 | 4/2008 | Jackson | 715/736 |
| 7,363,342 | B1 | 4/2008 | Wang et al. | 709/204 |
| 7,364,510 | B2 | 4/2008 | Walker et al. | 463/42 |
| 7,370,282 | B2 | 5/2008 | Cary | 715/772 |
| 7,384,339 | B2 | 6/2008 | LeMay et al. | 463/30 |
| 7,398,327 | B2 | 7/2008 | Lee | 709/250 |
| 7,410,422 | B2 | 8/2008 | Fine | 463/42 |
| 7,419,428 | B2 | 9/2008 | Rowe | 463/25 |
| 7,427,233 | B2 | 9/2008 | Walker et al. | 463/16 |
| 7,427,236 | B2 | 9/2008 | Kaminkow et al. | 463/26 |
| 7,434,805 | B2 | 10/2008 | Grauzer et al. | 273/149 R |
| 7,435,179 | B1 | 10/2008 | Ford | 463/42 |
| 7,438,643 | B2 | 10/2008 | Brosnan et al. | 463/42 |
| 7,455,591 | B2 | 11/2008 | Nguyen | 463/42 |
| 7,460,863 | B2 | 12/2008 | Steelberg et al. | 455/419 |
| 7,465,231 | B2 | 12/2008 | Lewin et al. | 463/37 |
| 7,483,394 | B2 | 1/2009 | Chang et al. | 370/254 |
| 7,500,915 | B2 | 3/2009 | Wolf et al. | 463/27 |
| 7,510,474 | B2 | 3/2009 | Carter, Sr. | 463/29 |
| 7,515,718 | B2 | 4/2009 | Nguyen et al. | 380/278 |
| 7,534,169 | B2 | 5/2009 | Amaitis et al. | 463/39 |
| 7,549,576 | B2 | 6/2009 | Alderucci et al. | 235/380 |
| 7,559,080 | B2 | 7/2009 | Bhargavan et al. | 726/1 |
| 7,575,234 | B2 | 8/2009 | Soltys et al. | 273/149 R |
| 7,577,847 | B2 | 8/2009 | Nguyen et al. | 713/186 |
| 7,578,739 | B2 | 8/2009 | Gauselmann | 463/27 |
| 7,581,256 | B2 | 8/2009 | Cockerille et al. | 726/30 |
| 7,585,217 | B2 | 9/2009 | Lutnick et al. | 463/16 |
| 7,611,407 | B1 | 11/2009 | Itkis et al. | 463/29 |
| 7,611,409 | B2 | 11/2009 | Muir et al. | 463/29 |
| 7,617,151 | B2 | 11/2009 | Rowe | 705/39 |
| 7,629,886 | B2 | 12/2009 | Steeves | 340/572.1 |
| 7,634,550 | B2 | 12/2009 | Wolber et al. | 709/220 |
| 7,637,810 | B2 | 12/2009 | Amaitis et al. | 463/25 |
| 7,644,861 | B2 | 1/2010 | Alderucci et al. | 235/382 |
| 7,648,414 | B2 | 1/2010 | McNutt et al. | 463/25 |
| 7,682,249 | B2 | 3/2010 | Winans et al. | 463/31 |
| 7,684,874 | B2 | 3/2010 | Schlottmann et al. | 700/9 |
| 7,685,593 | B2 | 3/2010 | Solomon et al. | 717/170 |
| 7,686,688 | B2 | 3/2010 | Friedman et al. | 463/25 |
| 7,690,995 | B2 | 4/2010 | Frankulin et al. | 463/41 |
| 7,699,697 | B2 | 4/2010 | Darrah et al. | 463/16 |
| 7,699,703 | B2 | 4/2010 | Muir et al. | 463/29 |
| 7,702,719 | B1 * | 4/2010 | Betz et al. | 709/205 |
| 7,722,453 | B2 | 5/2010 | Lark et al. | 463/16 |
| 7,730,198 | B2 | 6/2010 | Ruppert et al. | 709/230 |
| 7,744,462 | B2 | 6/2010 | Grav et al. | 463/27 |
| 7,747,741 | B2 | 6/2010 | Basani et al. | 709/224 |
| 7,753,790 | B2 | 7/2010 | Nguyen et al. | 463/42 |
| 7,769,877 | B2 | 8/2010 | McBride et al. | 709/230 |
| 7,778,635 | B2 | 8/2010 | Crookham et al. | 455/426.1 |
| 7,780,525 | B2 | 8/2010 | Walker et al. | 463/29 |
| 7,780,526 | B2 | 8/2010 | Nguyen et al. | 463/29 |
| 7,783,881 | B2 | 8/2010 | Morrow et al. | 713/165 |
| 7,785,204 | B2 | 8/2010 | Wells et al. | 463/42 |
| 7,824,267 | B2 | 11/2010 | Cannon et al. | 463/42 |
| 7,828,649 | B2 | 11/2010 | Cuddy et al. | 463/26 |
| 7,841,946 | B2 | 11/2010 | Walker et al. | 463/42 |
| 7,846,020 | B2 | 12/2010 | Walker et al. | 463/29 |
| 7,850,528 | B2 * | 12/2010 | Wells | 463/42 |
| 7,862,425 | B2 | 1/2011 | Cavagna | 463/25 |
| 7,867,081 | B2 | 1/2011 | Schneider et al. | 463/25 |
| 7,874,921 | B2 | 1/2011 | Baszucki et al. | 463/43 |
| 7,898,679 | B2 | 3/2011 | Brack et al. | 358/1.15 |
| 7,901,294 | B2 | 3/2011 | Walker et al. | 463/42 |
| 7,905,780 | B2 | 3/2011 | Morrow et al. | 463/31 |
| 7,931,533 | B2 | 4/2011 | LeMay et al. | 463/29 |
| 7,937,464 | B2 | 5/2011 | Ruppert et al. | 709/224 |
| 2001/0019966 | A1 | 9/2001 | Idaka | 463/40 |
| 2002/0086725 | A1 | 7/2002 | Fasbender et al. | 463/11 |
| 2002/0111213 | A1 | 8/2002 | McEntee et al. | 463/42 |
| 2002/0113371 | A1 | 8/2002 | Snow | 273/292 |
| 2002/0115487 | A1 | 8/2002 | Wells | 463/42 |
| 2003/0004871 | A1 | 1/2003 | Rowe | 705/39 |
| 2003/0032474 | A1 | 2/2003 | Kaminkow | 463/25 |
| 2003/0042679 | A1 | 3/2003 | Snow | 273/292 |
| 2003/0064798 | A1 | 4/2003 | Grauzer et al. | 463/29 |
| 2003/0075869 | A1 | 4/2003 | Breeding et al. | 273/292 |
| 2003/0090064 | A1 | 5/2003 | Hoyt et al. | 273/292 |
| 2003/0104865 | A1 | 6/2003 | Itkis et al. | 463/39 |
| 2003/0130024 | A1 | 7/2003 | Darby | 463/13 |
| 2003/0203755 | A1 | 10/2003 | Jackson | 463/42 |
| 2003/0206548 | A1 | 11/2003 | Bannai et al. | 370/389 |
| 2003/0224858 | A1 | 12/2003 | Yoseloff et al. | 463/43 |
| 2003/0232651 | A1 | 12/2003 | Huard et al. | 463/42 |
| 2004/0002388 | A1 | 1/2004 | Larsen et al. | 463/43 |
| 2004/0029635 | A1 | 2/2004 | Giobbi | 463/30 |
| 2004/0043815 | A1 | 3/2004 | Kaminkow | 463/25 |
| 2004/0043820 | A1 | 3/2004 | Schlottmann | 463/43 |
| 2004/0048671 | A1 | 3/2004 | Rowe | 463/42 |
| 2004/0082385 | A1 | 4/2004 | Silva et al. | 463/40 |
| 2004/0092310 | A1 | 5/2004 | Brosnan et al. | 463/42 |
| 2004/0106452 | A1 | 6/2004 | Nguyen et al. | 463/42 |
| 2004/0110119 | A1 | 6/2004 | Riconda et al. | 434/350 |
| 2004/0127291 | A1 | 7/2004 | George et al. | 463/42 |
| 2004/0133485 | A1 | 7/2004 | Schoonmaker et al. | 705/30 |
| 2004/0142744 | A1 | 7/2004 | Atkinson et al. | 463/29 |
| 2004/0166940 | A1 | 8/2004 | Rothschild | 463/42 |
| 2004/0185936 | A1 | 9/2004 | Block et al. | 463/42 |
| 2005/0043094 | A1 | 2/2005 | Nguyen et al. | 463/42 |
| 2005/0054438 | A1 | 3/2005 | Rothschild et al. | 463/29 |
| 2005/0054445 | A1 | 3/2005 | Gatto et al. | 463/42 |
| 2005/0070358 | A1 | 3/2005 | Angell et al. | 463/39 |
| 2005/0119052 | A1 | 6/2005 | Russell et al. | 463/42 |
| 2005/0153778 | A1 | 7/2005 | Nelson et al. | 463/42 |
| 2005/0176502 | A1 * | 8/2005 | Nishimura et al. | 463/31 |
| 2005/0222891 | A1 | 10/2005 | Chan et al. | 705/9 |
| 2005/0239542 | A1 | 10/2005 | Olsen | 463/27 |
| 2005/0282626 | A1 | 12/2005 | Manfredi et al. | 463/25 |
| 2006/0004618 | A1 | 1/2006 | Brixius | 705/8 |
| 2006/0009282 | A1 | 1/2006 | George et al. | 463/29 |
| 2006/0015716 | A1 | 1/2006 | Thornton et al. | 713/155 |
| 2006/0026499 | A1 | 2/2006 | Weddle | 715/503 |
| 2006/0035707 | A1 | 2/2006 | Nguyen et al. | 463/29 |
| 2006/0046849 | A1 | 3/2006 | Kovacs | 463/39 |
| 2006/0116208 | A1 | 6/2006 | Chen et al. | 463/43 |
| 2006/0121970 | A1 | 6/2006 | Khal | 463/16 |
| 2006/0183541 | A1 | 8/2006 | Okada et al. | 463/29 |
| 2006/0195847 | A1 | 8/2006 | Amano et al. | 718/103 |
| 2006/0205508 | A1 | 9/2006 | Green | 463/40 |
| 2006/0247013 | A1 | 11/2006 | Walker et al. | 463/20 |
| 2006/0247057 | A1 | 11/2006 | Green et al. | 463/42 |
| 2006/0248161 | A1 | 11/2006 | O'Brien et al. | 709/217 |
| 2006/0277487 | A1 | 12/2006 | Poulsen et al. | 715/772 |
| 2007/0015583 | A1 | 1/2007 | Tran | 463/40 |
| 2007/0033247 | A1 | 2/2007 | Martin | 709/201 |
| 2007/0054740 | A1 | 3/2007 | Salls et al. | 463/42 |
| 2007/0057453 | A1 | 3/2007 | Soltys et al. | 273/149 P |
| 2007/0057454 | A1 | 3/2007 | Fleckenstein | 273/149 R |
| 2007/0057469 | A1 | 3/2007 | Grauzer et al. | 273/309 |
| 2007/0060259 | A1 | 3/2007 | Pececnik | 463/16 |
| 2007/0060307 | A1 | 3/2007 | Mathis et al. | 463/25 |
| 2007/0060365 | A1 | 3/2007 | Tien et al. | 463/42 |
| 2007/0077995 | A1 | 4/2007 | Oak et al. | 463/42 |
| 2007/0093298 | A1 | 4/2007 | Brunet | 463/42 |
| 2007/0105628 | A1 | 5/2007 | Arbogast et al. | 463/42 |
| 2007/0111775 | A1 | 5/2007 | Yoseloff | 463/16 |
| 2007/0111791 | A1 | 5/2007 | Arbogast et al. | 463/40 |
| 2007/0111794 | A1 | 5/2007 | Hogan et al. | 463/42 |
| 2007/0117608 | A1 | 5/2007 | Roper et al. | 463/16 |
| 2007/0124483 | A1 | 5/2007 | Marples et al. | 709/228 |
| 2007/0129145 | A1 | 6/2007 | Blackburn et al. | 463/42 |
| 2007/0150329 | A1 | 6/2007 | Brook et al. | 705/8 |
| 2007/0167235 | A1 | 7/2007 | Naicker | 463/42 |
| 2007/0191102 | A1 | 8/2007 | Coliz et al. | 463/42 |
| 2007/0192748 | A1 | 8/2007 | Martin et al. | 715/856 |
| 2007/0198418 | A1 | 8/2007 | MacDonald et al. | 705/52 |
| 2007/0208816 | A1 | 9/2007 | Baldwin et al. | 709/206 |
| 2007/0218998 | A1 | 9/2007 | Arbogast et al. | 463/42 |
| 2007/0235521 | A1 | 10/2007 | Mateen et al. | 235/379 |
| 2007/0241497 | A1 | 10/2007 | Soltys et al. | 273/149 R |

2007/0241498 A1 10/2007 Soltys ........ 273/149 R
2007/0243925 A1 10/2007 LeMay et al. ........ 463/20
2007/0243927 A1 10/2007 Soltys ........ 463/25
2007/0243935 A1 10/2007 Huizinga ........ 463/42
2007/0259709 A1 11/2007 Kelly et al. ........ 463/20
2007/0259711 A1 11/2007 Thomas ........ 463/22
2007/0287535 A1 12/2007 Soltys ........ 463/29
2007/0298868 A1 12/2007 Soltys ........ 463/25
2008/0004108 A1 1/2008 Klinkhammer ........ 463/29
2008/0009344 A1 1/2008 Graham et al. ........ 463/25
2008/0026832 A1 1/2008 Stevens et al. ........ 463/26
2008/0026848 A1 1/2008 Byng ........ 463/42
2008/0038035 A1 2/2008 Shuldman et al. ........ 400/76
2008/0045341 A1 2/2008 Englman ........ 463/42
2008/0064501 A1 3/2008 Patel ........ 463/40
2008/0076572 A1 3/2008 Nguyen et al. ........ 463/42
2008/0090651 A1 4/2008 Baerlocher ........ 463/27
2008/0096659 A1 4/2008 Kreloff et al. ........ 463/39
2008/0108433 A1 5/2008 DiMichele et al. ........ 463/40
2008/0113764 A1 5/2008 Soltys ........ 463/22
2008/0113773 A1 5/2008 Johnson et al. ........ 463/25
2008/0113793 A1* 5/2008 Miyamoto et al. ........ 463/31
2008/0117339 A1* 5/2008 Kirsche ........ 348/734
2008/0119284 A1 5/2008 Luciano, Jr. et al. ........ 463/42
2008/0146337 A1 6/2008 Halonen et al. ........ 463/42
2008/0153599 A1 6/2008 Atashband et al. ........ 463/42
2008/0153600 A1 6/2008 Swarna ........ 463/43
2008/0154916 A1 6/2008 Atashband ........ 707/10
2008/0155665 A1 6/2008 Ruppert et al. ........ 726/5
2008/0162729 A1 7/2008 Ruppert ........ 709/249
2008/0171588 A1 7/2008 Atashband ........ 463/20
2008/0171598 A1 7/2008 Deng ........ 463/40
2008/0200255 A1 8/2008 Eisele ........ 463/42
2008/0243697 A1 10/2008 Irving et al. ........ 705/54
2008/0261701 A1 10/2008 Lewin et al. ........ 463/43
2008/0287197 A1 11/2008 Ruppert et al. ........ 463/42
2008/0293494 A1 11/2008 Adiraju et al. ........ 463/42
2008/0311971 A1 12/2008 Dean ........ 463/20
2008/0318685 A9 12/2008 Oak et al. ........ 463/42
2009/0005176 A1 1/2009 Morrow et al. ........ 463/43
2009/0011833 A1 1/2009 Seelig et al. ........ 463/42
2009/0029775 A1 1/2009 Ruppert et al. ........ 463/42
2009/0031008 A1 1/2009 Elliott et al. ........ 709/220
2009/0115133 A1 5/2009 Kelly et al. ........ 273/274
2009/0117994 A1 5/2009 Kelly et al. ........ 463/25
2009/0118001 A1 5/2009 Kelly et al. ........ 463/29
2009/0118005 A1 5/2009 Kelly et al. ........ 463/31
2009/0118006 A1 5/2009 Kelly et al. ........ 463/31
2009/0124392 A1 5/2009 Ruppert et al. ........ 463/42
2009/0124394 A1 5/2009 Swarna ........ 463/43
2009/0125603 A1 5/2009 Atashband et al. ........ 709/207
2009/0131144 A1 5/2009 Allen ........ 463/20
2009/0131163 A1 5/2009 Arbogast et al. ........ 463/29
2009/0132720 A1 5/2009 Ruppert et al. ........ 709/231
2009/0176556 A1* 7/2009 Gagner et al. ........ 463/25
2009/0176580 A1 7/2009 Herrmann et al. ........ 463/43
2009/0181776 A1 7/2009 Deng ........ 463/42
2009/0253483 A1 10/2009 Pacey et al. ........ 463/20
2009/0270170 A1 10/2009 Patton ........ 463/36
2009/0275393 A1 11/2009 Kisenwether et al. ........ 463/25
2009/0275394 A1 11/2009 Young et al. ........ 463/25
2009/0275400 A1 11/2009 Rehm et al. ........ 463/27
2009/0275401 A1 11/2009 Allen et al. ........ 463/29
2009/0275402 A1 11/2009 Backover et al. ........ 463/29
2009/0275407 A1 11/2009 Singh et al. ........ 463/31
2009/0276341 A1 11/2009 McMahan et al. ........ 705/30
2009/0298583 A1 12/2009 Jones ........ 463/29
2009/0307069 A1 12/2009 Meyerhofer ........ 705/14.12
2010/0016067 A1 1/2010 White et al. ........ 463/25
2010/0016068 A1 1/2010 White et al. ........ 463/25
2010/0029385 A1 2/2010 Garvey et al. ........ 463/35
2010/0048291 A1 2/2010 Warkentin ........ 463/25
2010/0093441 A1 4/2010 Rajaraman et al. ........ 463/42
2010/0124990 A1 5/2010 Crowder ........ 463/42
2010/0125851 A1 5/2010 Singh et al. ........ 718/104
2010/0130280 A1 5/2010 Arezina et al. ........ 463/20
2010/0131772 A1 5/2010 Atashband et al. ........ 713/189
2010/0151926 A1 6/2010 Ruppert et al. ........ 463/1
2010/0161798 A1 6/2010 Ruppert et al. ........ 709/225
2010/0234104 A1 9/2010 Ruppert et al. ........ 463/30
2010/0248842 A1 9/2010 Ruppert ........ 463/42
2011/0009184 A1 1/2011 Byng ........ 463/20
2011/0124417 A1 5/2011 Baynes et al. ........ 463/43

FOREIGN PATENT DOCUMENTS

| | | | |
|---|---|---|---|
| EP | 1074955 | A2 | 2/2001 |
| EP | 1463008 | A2 | 9/2004 |
| GB | 2380143 | A | 4/2003 |
| JP | 8255059 | | 10/1996 |
| KR | 2001-0084838 | | 9/2001 |
| KR | 2002-0061793 | | 7/2002 |
| KR | 2003-0091635 | | 12/2003 |
| WO | 02/05914 | A1 | 1/2002 |
| WO | 03/060846 | A2 | 7/2003 |
| WO | 2005/035084 | | 4/2005 |
| WO | 2007/033207 | A2 | 3/2007 |

OTHER PUBLICATIONS

Bally TMS, “MP21—Automated Table Tracking/Features,” 2 pages, Nov. 2005.

Bally TMS, “MPBacc—Specifications/Specifications,” 2 pages, Nov. 2005.

Bally TMS, “MPLite—Table Management System/Features,” 2 pages, Nov. 2005.

Bulavsky, J., “Tracking the Tables,” *Casino Journal*, May 2004, pp. 44-47, accessed Dec. 21, 2005, URL = http://www.ascendgaming.com/cj/vendors_manufacturers_table/Trackin916200411141AM.htm, 5 pages.

Burke, A., “Tracking the Tables,” reprinted from *International Gaming & Wagering Business*, Aug. 2003, 4 pages.

Gros, R., “All You Ever Wanted to Know About Table Games,” reprinted from *Global Gaming Business*, Aug. 1, 2003, 2 pages.

MagTek, “Port Powered Swipe Reader,” Technical Reference Manual, Manual Part No. 99875094 Rev 12, Jun. 2003, 20 pages.

Mikohn, “Tablelink™, The New Standard in Table Games,” before Jan. 1, 2004, 14 pages.

Terdiman, D., “Who’s Holding the Aces Now?”, reprinted from *Wired News*, Aug. 18, 2003, 2 pages.

Winkler, C., “Product Spotlight: MindPlay,” reprinted from *Gaming and Leisure Technology*, Fall 2003, 2 pages.

International Search Report and Written Opinion, mailed Dec. 22, 2009, for PCT/US2009/042149, 6 pages.

Kisenwether et al.“Systems, Methods, and Devices for Providing Instances of a Secondary Game,” Office Action mailed Jun. 28, 2011, for U.S. Appl. No. 12/112,740, 20 pages.

* cited by examiner

APPARATUS, METHOD, AND SYSTEM TO PROVIDE A MULTIPLE PROCESSOR ARCHITECTURE FOR SERVER-BASED GAMING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This disclosure generally relates to gaming devices, and more particularly but not exclusively, relates to electronic gaming machines (EGMs).

2. Description of the Related Art

Gaming properties often devote a large percentage of floor space to gaming devices. Each gaming device presents players with individual games of chance, games of skill, or combinations thereof that they may wager on.

In modern gaming properties, many gaming devices are in the form of electronic gaming machines (EGMs) that may include specialized computing devices or specially programmed general purpose computing devices along with user input and output interfaces and financial transaction components. These EGMs have been subject to ever greater computational demands. Each EGM may provide, inter alia, the following: offer a number of graphics-intensive games of chance and associated bonus games to players; communicate via a network with one or more servers within the gaming property; display the content of one or more web pages; receive and process currency of various types inserted by players; display targeted advertisements and other audiovisual content to players; process and store information indicative of wagers made by players; and so forth. As these computational demands have continued to multiply, the computational power provided in each EGM has needed to be increased in order to enable more and more functionality.

However, existing solutions to address the computational demands have often been unsatisfactory and/or have needed improvement.

BRIEF SUMMARY OF THE INVENTION

A method of operating a multi-processor architecture in an electronic gaming environment may be summarized as including: providing a first processor to execute a logic engine for a game; providing a second processor to execute only a presentation engine for said game; executing by said first processor said logic engine to process player input to obtain an outcome pertaining to said game; sending, by said first processor to said second processor, a control signal that corresponds to said outcome; and executing, by said second processor in response to said control signal sent by said first processor, said presentation engine to present said outcome.

A multi-processor system in an electronic gaming environment may be summarized as including: a first processor adapted to execute a logic engine for a game; a second processor adapted to execute only a presentation engine for the game; a first processor-readable storage medium coupled to the first processor and that stores a first set of processor-executable instructions that implement the logic engine, the first set of processor-executable instructions being executable by the first processor to process player input to obtain an outcome pertaining to the game; a communication line coupled to the first and second processors, and adapted to be used by the first processor to send to the second processor a control signal that corresponds to the outcome; and a second processor-readable storage medium coupled to the second processor and that stores a second set of processor-executable instructions that implement the presentation engine, the second set of processor-executable instructions being executable by the second processor in response to the control signal sent by the first processor to present the outcome.

An electronic gaming machine (EGM) apparatus may be summarized as including: at least one processor adapted to execute only a presentation engine for a game, wherein another processor is adapted to execute a logic engine for the game; and a processor-readable storage medium coupled to the at least one processor and that stores a set of processor-executable instructions that implement the presentation engine, the set of processor-executable instructions being executable by the at least one processor to present an outcome pertaining to the game, in response to a control signal received from the another processor and generated by the another processor in response to application of the logic engine to player input.

A server apparatus in an electronic gaming environment may be summarized as including: at least one processor adapted to execute a game logic engine for a game, wherein another processor is adapted to execute only a presentation engine for the game; and a processor-readable storage medium coupled to the at least one processor and that stores a set of processor-executable instructions that implement the game logic engine, the set of processor-executable instructions being executable by the at least one processor to obtain an outcome pertaining to the game in response to player input, the at least one processor being adapted to generate a control signal corresponding to the outcome and to send the control signal to the another processor to enable the another processor to execute the presentation engine to present the outcome.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS OF THE INVENTION

Figure 1:
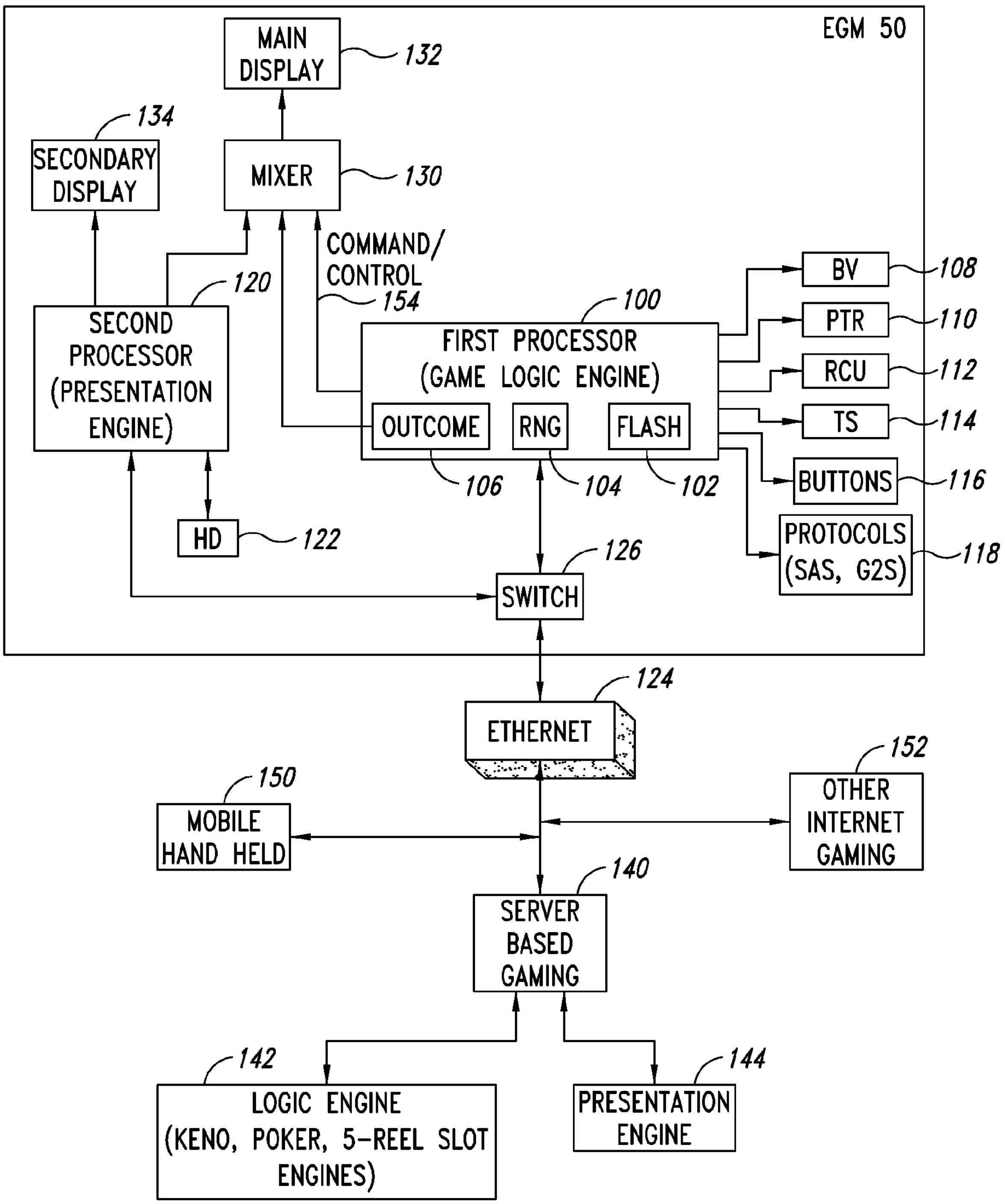
FIG. 1 is a block diagram of one embodiment of a multi-processor architecture for an EGM.

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is, as "including, but not limited to."

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings provided herein are for convenience only and do not interpret the scope or meaning of the embodiments.

As an overview, one embodiment provides an architecture for an electronic gaming machine (EGM) environment, comprising multiple processors that separate a game's input/output (I/O) handling (e.g., game logic) from the game's presentation handling. The multi-processor architecture includes a dedicated I/O (e.g., game logic) engine and a dedicated presentation engine. A first processor is dedicated to handle the I/O, peripherals, communications, accounting, critical gaming and other game logic, power hit tolerances, protocols to other systems, and other tasks related to operation of the EGM. A second processor is dedicated to running a presentation engine only. The second processor of one embodiment can be part of a thin-client (or a smart thin client having local presentation code and graphics that can be downloaded and updated), and receives commands from the first processor to present game-oriented outcome and results.

Such embodiments would be useful in gaming properties, such as casinos having multiple EGMs from different manufacturers, where one manufacturer's game cannot be installed in another manufacturer's EGM. By separating the game logic engine from the presentation engine, flexibility is provided by one embodiment to allow selection of any suitable presentation engine that can be executed using a multimedia-friendly operating system. Since a majority of the manufactured EGMs have a typical game logic engine installed for controlling the I/O and downloads to all peripherals, one embodiment enables the corresponding presentation engine to be selected from a choice of available products, which may be provided by other parties/manufacturers.

One embodiment of the multi-processor architecture supports gaming growth, by way of its separation of the presentation logic from the game logic, thereby providing a migration path from a restrictive EGM environment in which there are incompatible and disparate EGMs that each provide their own proprietary game logic engine and presentation engine, to a future casino floor with third parties developing the presentation engines. A potential result of one embodiment is to provide a casino in which the EGMs have a common first processor for game logic and a choice in presentation engines. Such a casino would therefore be less reliant on proprietary games and networks, and there would be less need to buy multiple EGMs from one manufacturer. Thus, one embodiment meets the challenge in the gaming industry of providing an architecture that is adaptive to the regulatory and technology environment, by creating a common gaming network that can use less-expensive third party presentation engine developers.

In addition to providing a migration path away from the existing environment of EGMs having just one processor and proprietary game logic and graphics, one embodiment of the multi-processor architecture can be integrated with server-based gaming elements. For example, one embodiment of a hybrid fat/thin client with which the multi-processor architecture can be implemented is described herein.

One embodiment of the multi-processor architecture also addresses the deficiencies of previous EGM implementations, in which a first processor drove the peripherals and I/O and a second processor driving the multimedia did not do presentation alone, but also did accounting, hit tolerances, and critical gaming operations. As such, the second processor was a gaming device in itself. Such previous implementations required both processors to operate in synchronization. In contrast with one embodiment of the multi-processor architecture, the second processor is dedicated to driving the presentation only, while the first processor is independent of the second processor and is used for the game logic.

For the sake of simplicity and convenience, embodiments will be described herein in the context of a "multi-processor" implementation (such as a "dual-processor" system), rather than in the context of a "multi-core processor" implementation (such as a "dual-core processor" configuration). Dual-processor (DP) systems, for example, are generally those that contain two separate physical processors in the same (or different) chassis. In DP systems such as with the embodiments described herein, the two processors can either be located on the same motherboard or on separate boards. In comparison, for an example dual-core processor configuration, an integrated circuit (IC) contains two complete processor cores. The two processor cores may be manufactured so that they reside side-by-side on the same die, each with its own path to a system front-side bus.

In other embodiments, a multi-core processor implementation (such as a dual-core processor configuration) can be provided, in which a first processor core runs the game logic and a second processor core runs the presentation. Examples of a multi-core processor implementation in an EGM are described in U.S. patent application Ser. No. 12/271,337, entitled "APPARATUS, METHOD, AND SYSTEM TO PROVIDE A MULTI-CORE PROCESSOR FOR AN ELECTRONIC GAMING MACHINE (EGM)," filed concurrently herewith," assigned to the same assignee as the present application, and incorporated herein by reference in its entirety.

Further for the sake of simplicity of explanation and convenience, various embodiments will be described herein in the context of dual-processor architecture. In other embodiments of the multi-processor architecture, more than two processors may be used.

FIG. 1 is a block diagram of the one embodiment of a system that includes an EGM 50 having a multi-processor architecture. The EGM 50 may be located within a gaming property (not shown) comprising any of a variety of establishments housing one or more EGMs used for gaming/gambling. In one embodiment, the EGM 50 may be located within a casino. However, places such as convenience stores, hotels, gas stations, supermarkets, or other establishments that are capable of housing the EGM 50 may be considered as gaming property.

The EGM 50 may be adapted to run any one or more of a variety of games of chance, games of skill, or combinations thereof that a player may wager on. Such games may include, but not be limited to, video slot machines, video keno, video poker, video blackjack, Class II bingo, lottery, craps, a mechanical or video representation of a wheel game, etc. In one embodiment, the EGM 50 is a single-offering EGM, enabling play of only one game. However, in other embodiments, the EGM 50 is relatively flexible, allowing a player to choose from among a number of games.

As shown in FIG. 1, the EGM 50 includes a first processor 100 adapted to run a game logic engine. The first processor 100 of one embodiment can comprise a "low-end" central processing unit (CPU) or any other type of processor capable of executing game logic and managing peripherals. The game logic engine of one embodiment can be in the form of a software application or other processor-executable instructions executable by the first processor 100. The game logic engine can also be embodied as hardware, and/or as a combination of hardware and processor-executable instructions.

The first processor 100 is provided with a processor-readable storage unit (such as a compact flash 102), a random number generator (RNG) 104, and an outcome unit 106. The first processor 100 of one embodiment is adapted to manage peripherals that may include: a bill validator (BV) 108, a printer (PTR) 110, a reel control unit (RCU) 112, a touch-screen (TS) 114, buttons 116, protocols (such as SAS and G2S) 118, and a USB or other peripheral/network connection (not shown).

The EGM 50 of one embodiment includes a second processor 120 adapted to run a presentation engine. The presentation engine of one embodiment can also be in the form of a software application or other processor-executable instructions executable by the second processor 120. The presentation engine can also be embodied as hardware, and/or as a combination of hardware and processor-executable instructions.

The second processor 120 of one embodiment can comprise part of a game console, such as an Xbox or other gaming unit. The second processor 120 is coupled to a processor-readable storage medium (such as a hard disk 122) to execute processor-executable instructions stored thereon, which may include the presentation engine, and may also be coupled to a peripheral/network connection, such as a USB connection (not shown). In one embodiment, the first processor 100 may also be coupled to a different or same processor-readable storage medium (e.g., the same hard disk 122) in order to execute processor-executable instructions stored thereon, which may include the game logic engine. Together with the first processor 100, the second processor 120 is coupled to a network (such as an Ethernet 124) by a switch 126.

Both the first processor 100 and the second processor 120 are coupled to and use a mixer 130 to drive a main display 132, with the second processor 120 also having connection to a secondary display 134. By way of the Ethernet 124, the EGM 50 can be communicatively coupled to a back-end server 140 for server-based gaming, for communicating control and accounting information, for receiving downloads, and so forth. The back end server 140 may include or is coupled to a game logic engine(s) 142 and a presentation engine(s) 144. Other devices that may be communicatively coupled to the Ethernet 124 can include wireless hand-held devices 150 (usable for mobile gaming, for example) and other Internet gaming devices 152.

In one embodiment, the first processor 100 and related elements includes hardware similar to the iView product of Bally Technologies, Inc., less its display. Given that the iView product or other similar products have been developed as a gaming device with an ability to run Windows CE, Linux, or any ported operating system, the hardware of the first processor 100 is programmed to manage peripherals, accounting, etc., with its code stored in the compact flash 102. Of course, other embodiments can be provided in which the first processor 100 and related elements includes hardware that are different than the iView product.

FIG. 1 shows that one embodiment of the multi-processor architecture separates the game logic engine from the presentation engine. The first processor 100 runs the game logic engine, and the second processor 120 runs the presentation engine only, with the hard disk 122 being used to store the multimedia assets and further not being used to store anything of integrity or critical in nature. In another embodiment, the second processor 120 can be adapted to perform other tasks that may not necessarily be related to the presentation engine.

The switch 126, which may be located physically inside the EGM 50, is secure and is used to isolate the traffic between the first processor 100 and the second processor 120 from the rest of the Ethernet 124. The Ethernet 124 of one embodiment is made secure through the use of certificates for communications.

Activation (e.g., pushes) of the touch screen 114 and button 116 and responses thereto are managed by the first processor 100. As data is received by the first processor 100, the data are sent over using a communication protocol to the second processor 120 for display. A hypothetical game illustrates the interaction between the second processor 120 and the first processor 100 according to one embodiment:

First, a game patron (player) presses a button (e.g., one of the buttons 116) on the game console of the second processor 120 or EGM 50 to initiate play, such as a bet on a game. A command is transferred to the first processor 100 to initiate the request to play the game. The first processor 100 determines if the player has the credit to make the bet and to commit the requested credits, and returns a signal to the second processor 120 to display an update to the player's credit balance on the main display 132. The player next presses a start button, which then sends a command to the first processor 100 to request playing of a game of poker for the bet amount. The first processor 100 verifies that the player has placed a wager for the credits, and using the random number generator (RNG) 104 draws the results. The pay table, which is part of the outcome unit 106, is evaluated, and these evaluated poker cards by the pay table are sent back to the second processor 120 by the first processor 100. The second processor 120 displays on the main display 132 the poker game and its cards to the player, who then selects which cards to hold, and a press of a draw button by the player sends another command back to the first processor 100 to indicate the player has selected cards and is ready to draw. The RNG 104 pulls the remaining draw cards, and with the final outcome evaluated, the cards are returned to the second processor 120 for display to the player on the main display 132.

A feature of one embodiment of the multi-processor architecture is that for security reasons, all the critical gaming functionality is isolated on the first processor 100. This security feature is different from what been done before with conventional EGMs.

Another feature of one embodiment of the multi-processor architecture, with its separation of the presentation logic from the game logic, is a built-in migration path. In a manner that moves away from conventional EGMs having one processor and proprietary operating/graphics system, which has drawbacks, there is provided by an embodiment a migration to a configuration having a dedicated I/O (game logic) and a dedicated presentation via separated engines, and with possible movement of the two engines to the back-end server 140 for server-based gaming. Additionally, one embodiment allows for third party presentation engine development, and for the addition of other platforms with different presentation, including Internet gaming, in-room gaming, and hand-held mobile gaming.

Other features provided by one embodiment include management of the main display 132. The second processor 120 has video output to be displayed, and the first processor 100 also has video output to be displayed. Both video outputs connect through the mixer 130, which drives the main display 132. The mixer 130 allows the first processor 100 to still display video output on the main display 132 even if there is a problem with the second processor 120.

According to one embodiment, while the first processor 100 is displaying information on a back-end system, the second processor 120 is allowed to continue to display information on the main display 132. The second processor 120 remains in charge of the main display, 132 with an optional window display screen (e.g., the secondary display) to provide players with variety of gaming options.

Figure 2:
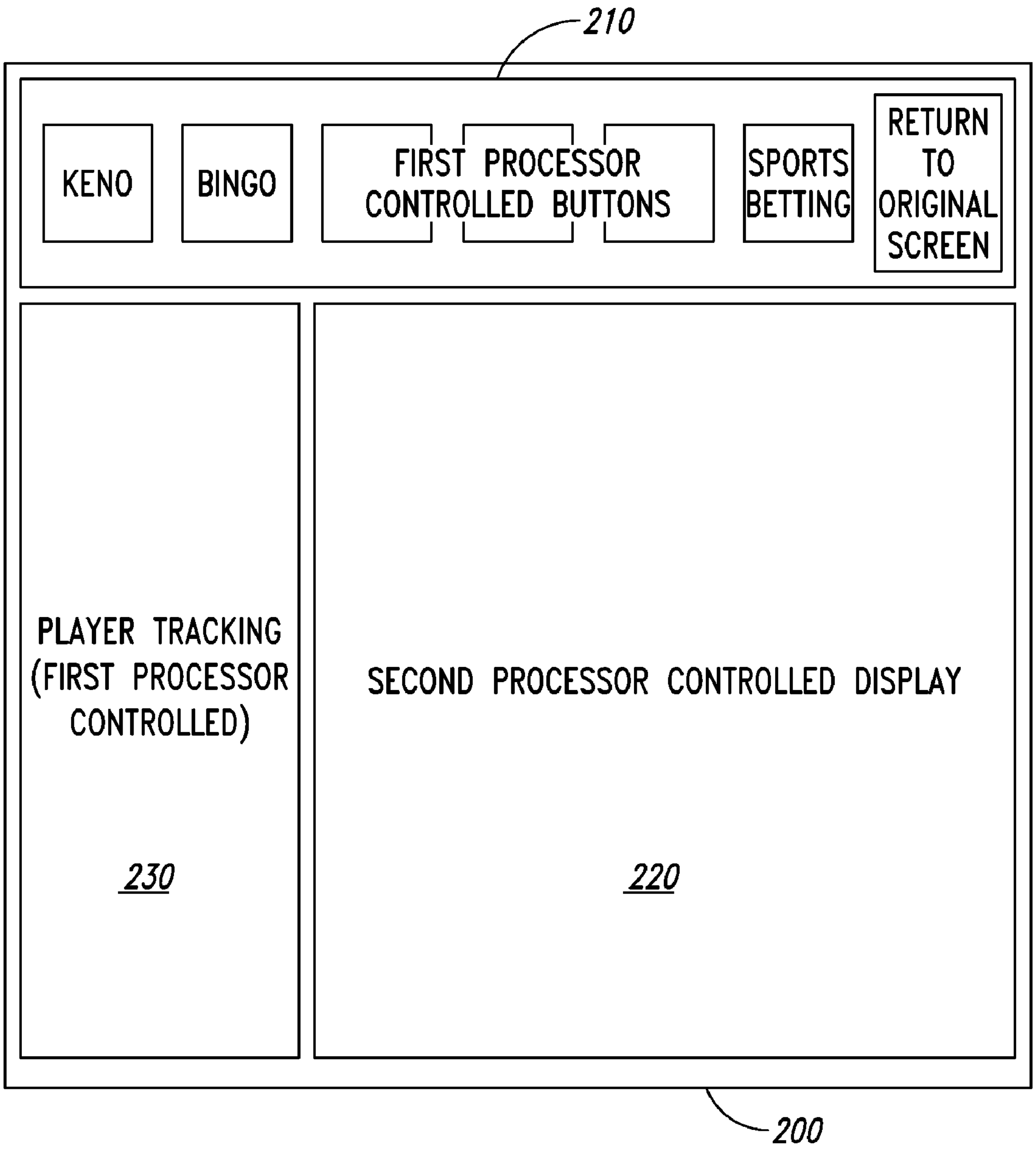
FIG. 2 shows an example display layout for the EGM of FIG. 1 according to one embodiment.

An example screen display layout associated with the second processor 120 is illustrated in FIG. 2. In FIG. 2, a game display 200 (which may be presented via the main display 132) has its top portion 210 managed by the first processor 100, where there is a variety of buttons, such as keno, bingo, sports betting, and a default button to return the screen to full display (such as a display of the presentation provided by the second processor 120). Underneath this top portion 210 and to the right is a display area 220 controlled by the second processor 120, and to the left is a player game screen area 230 controlled by the first processor 100. By default, the player game screen area 230 may for example display player tracking information. The display area 220 can be game-centric, without knowledge or ability to manage the other system functionality, given that system functionality is managed by the first processor 100.

The game screen area 230 is adapted to display a variety of content depending on specific button pushes that occur in the top portion 210. For example, if the player desires to purchase Keno ticket, a press of the Keno button in the top portion 210 displays "Keno" in the game screen area 230 so that the player may buy a ticket for the Keno game.

One embodiment also addresses the issue of how to display tilts and critical errors where there are two processors and only one main display 132. In a situation where the main display 132 is controlled by the second processor 120 only, then for each time that the first processor 100 needs to display content on the main display 132, the first processor 100 would be required to send commands across the Ethernet 124 to the second processor 120 to request a display. The second processor 120, while not containing any critical gaming functionality and having only media presentation capabilities, would therefore require having a sequence of commands programmed into it in order to be able to display requests from the first processor 100. If a problem in the EGM 50 occurs for which display requests have not been specifically programmed in the second processor 120, then the first processor 100 would not have access to the main display 132 in order to provide an alert of the problem.

Accordingly to address such a situation, one embodiment provides the first processor 100 with a separate communication channel 154 to the mixer 130, such that the first processor 100 controls both the mixer 130 and its own display. Such a feature enables the first processor 100 to mix its own content (such as displayed in the player game screen area 230) and to display its own critical messages, if necessary. For example, if a tilt comes out of the bill validator 108, causing loss of communication, the first processor 100 is able to send a command to the mixer 130 to implement a tilt screen window overlay. The overlay can be in the form of a center box displayed on the display area 220, and text or information regarding the tilt condition that has occurred on the EGM 50 is presented inside that box.

Figure 3:
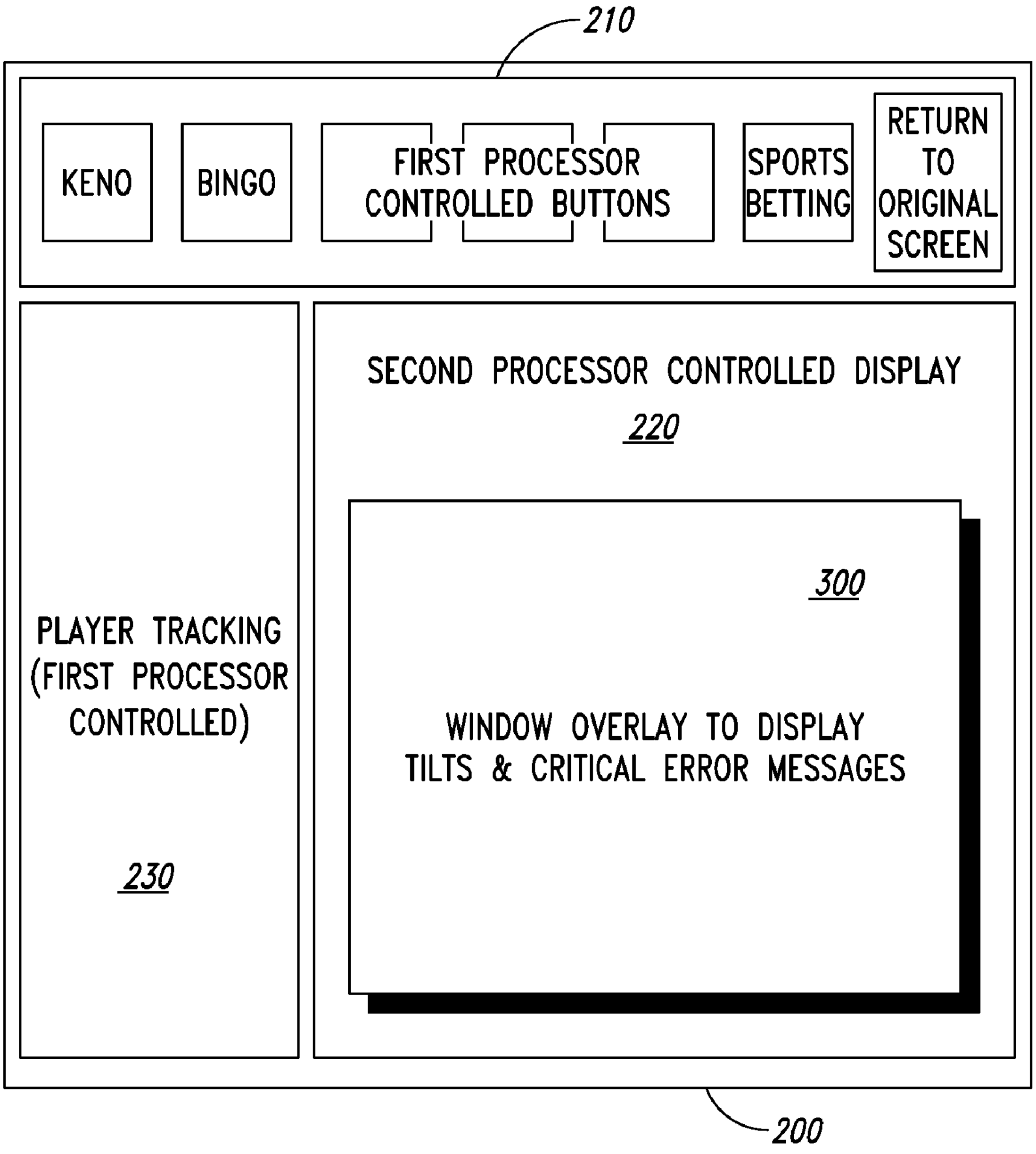
FIG. 3 shows another example display layout for the EGM of FIG. 1 according to one embodiment.

FIG. 3 illustrates the display area 220 with a window overlay 300 to display tilts and critical error messages. In FIG. 3, the game display 200 has the window overlay 300, with the window overlay being inside the display area 220, so as to show how a problem (if it occurs) is displayed to the player. Additionally, the first processor 100 can be enabled to minimize or expand the game display window 200 through the mixer 130, if appropriate.

In one embodiment, the second processor 120 can be provided with access to the secondary display 134. This access may be direct or may be run through the mixer 130.

A feature of the embodiment(s) described above is that the first processor 100 is a more robust embedded system and secure through an operating system (such as Linux), customized to intercept problem signals, and as such is unlikely to go down. Therefore, the first processor 100 can display error conditions even if there is a critical operating system problem, and regardless of the second processor 120, can display any error. The second processor 120 need not have exclusive control over the mixer 132 and as such only displays its own video or other content.

In one embodiment, the mixer 130 is embedded on a mother board itself. The mixer 130 does not necessitate a separate physical component, such that an ASIC chip can be designed to solely run the mixer 130 logic.

Figure 4:
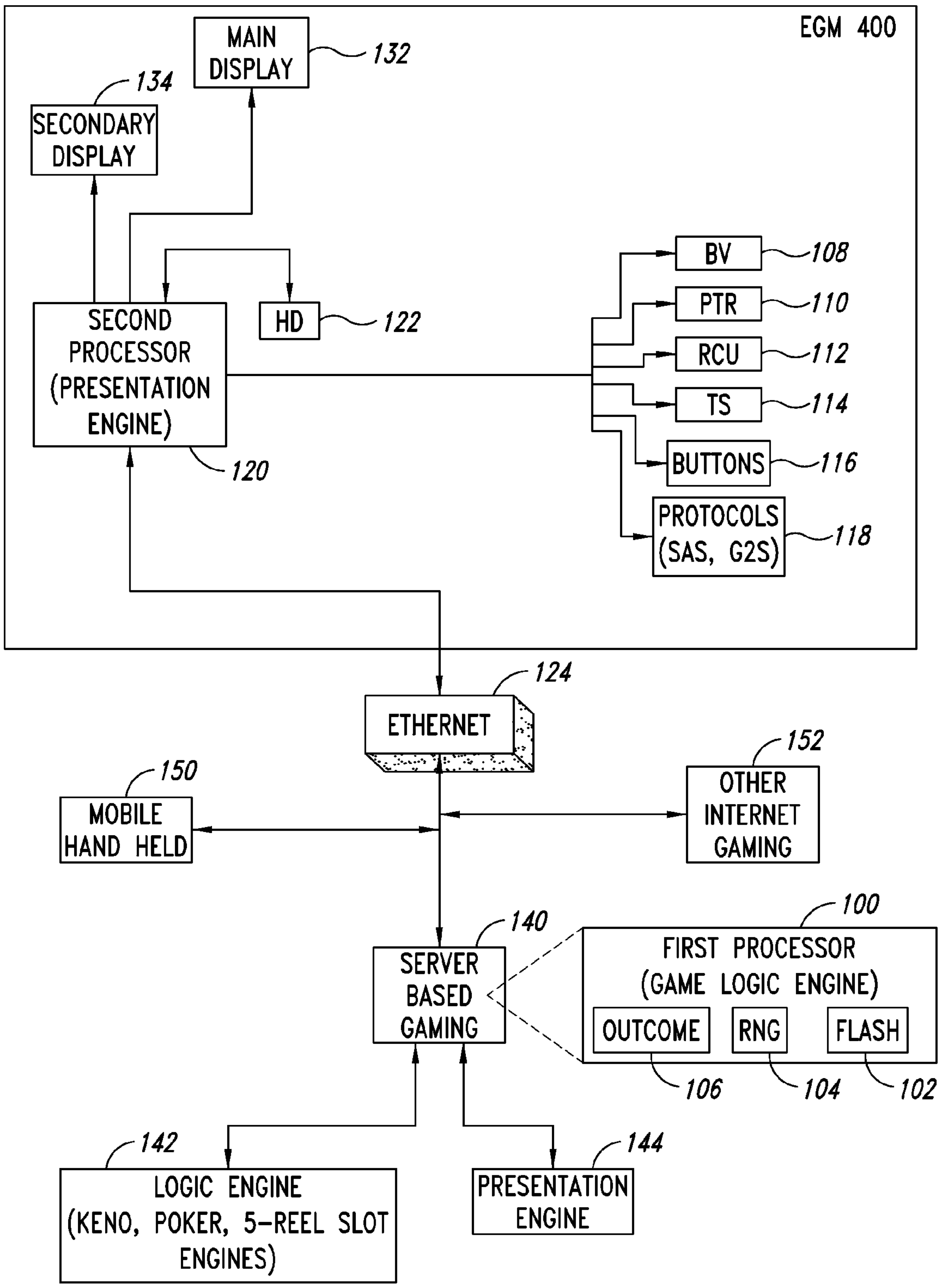
FIG. 4 is a block diagram of another embodiment of a multi-processor architecture for an EGM.

In one embodiment that implements server-based gaming (SBG), the outcome unit 106, the RNG 104, pay-tables, game logic, accounting, and the critical gaming functionality of the first processor 100 can be located at the back-end server 140. Such an SBG embodiment is shown in FIG. 4.

The second processor 120 (and its associated game console) may remain in an EGM 400 to enable the displaying of content, and the second processor 120 may be enhanced to control the I/O, the buttons 116, or to at least process the touch screen 114 and the inputs applied thereto. Additionally, with this "thinner" client configuration, the mixer 130 may not be necessary.

The server 140 may use its presentation engine 144 and game logic engine 142, alternatively or additionally to the engines provided by the second processor 120 and the first processor 100, to provide game functionality. In other embodiments, the presentation engine 144 and/or the game logic engine 142 may be downloaded from the server 140 to the respective processors of the EGM or other client device.

In another embodiment for the SBG, the first processor 100 may be kept at the EGM 400, except that the outcome unit 106 is located remotely in the server 140. The first processor 100 remains in the EGM 400 to manage some peripherals, such as for example if the second processor 120 malfunctions.

In an SBG embodiment, the server 140 is able to download content and/or commands to the EGM, and the gaming is still split into two engines: the logic engine 142 (and/or the logic engine of the first processor 100) and the presentation engine 144 (and/or the presentation engine of the second processor 120). Game developers can then develop game modules for the two engine parts, and incorporate any libraries between them.

With the logic engine 142 (and/or the logic engine of the first processor 100) responsible for the outcome, pay-tables, game logic, accounting, and all the critical gaming functionality, one embodiment can provide separate logic engines specific for each game type. For example, there can be Keno engines, poker engines, 5-reel slot engines, such that these engines manage all the logic for these game types. Therefore, if an EGM has 20 different games, there may be 20 associated logic engines that can be provided, given that each game may be different and may require its own engine.

In one embodiment, the presentation engine 144 layout is such that it is in a one-to-one correlation with the logic engine 142. Through a download feature of one embodiment, the presentation engine(s) 144 may be downloaded to the second processor 120, such as if the second processor 120 does not yet have a presentation engine installed therein and/or if additional presentation engines are needed. The game logic engine(s) 142 may be kept for use at the server 140 and/or downloaded to the first processor 100, if the EGM 50/400 has the first processor 100 located therein.

Separating the game logic and the game presentation into the two engines enables the workload to be separated. Regulated gaming companies can then manage and write the code or other processor-executable instructions for the logic engines, and third-party companies can create the presentation engines. Since the presentation engines of one embodiment do not include any critical gaming functionality, third-party development of games based on familiar gaming platforms is facilitated. This is a flexible architecture that may be adapted into many future configurations.

One embodiment that demonstrates this flexibility is mobile gaming via use of the wireless hand-held device 150. With a SBG implementation that uses the two separated engines (e.g., the presentation engine 144 and the logic engine 142), the hand held device 150 provides a display (such as a touch screen display) and is a thin client similar somewhat similar to the game console that includes the second processor 120, but may have a different presentation engine. The logic engine 142 may be the same for every device (whether a stationary EGM or the wireless hand-held device 150), but the presentation engine may be different depending upon the target platform destination, for example an Xbox poker and a Windows CE hand held poker presentation engine. The presentation engine(s) 144 can be customized for the desired target platform. In this example, the wireless hand-held device 150 may download a particular presentation engine 144 suitable for its requirements from the server 140, if the wireless hand-held device 150 does not yet have a suitable presentation engine installed therein.

For the Internet gaming device 152, a web browser with Active X controls that allows downloading may be installed therein, for example. The Internet gaming device 152 may use yet another (different) presentation engine 144, downloaded from the server 144, to drive the game content through its web browser. Even though there may be several different presentation engine platforms for the devices 150 and 152, the logic engine 142 of the server 140 may nevertheless be provided to drive the critical gaming functionality, accounting, recovery, etc.

A feature of one embodiment is that the first processor 100 may be a relatively inexpensive processor, and the second processor 120 and its accompanying game console may also be reasonably priced items. In one embodiment where the first processor 100 controls the hardware, proximity detection capability to locate casino players on the casino floor can be provided within the first processor 100 and/or with the hardware that it controls.

Another embodiment of the multi-processor architecture can be used where multiple operating systems are executing on one EGM. With such multiple processors present in one device, the graphics video card can be driven and the presentation can be executed with an operating system on one or more processors, and the remaining processors with their operating systems can drive the I/O and any game requirements/logic. The separation of the game logic and presentation logic still remains. The processor-executable code for the game logic and all the software may run on an operating system such as Linux, while the presentation can run on Microsoft Windows or other operating system that is multimedia friendly.

Another embodiment provides a hybrid fat/thin client, or "smart" client. Such smart clients can be in the form of EGMs that have an ability to download and maintain the configurations described herein (e.g., separation of game logic from game presentation) while remaining connected with the back-end server 140. These EGMs are neither only a fat client nor only a thin client with a browser. A fat client is generally a device that has all the code and the outcome determined on the EGM, with only information sent to the server, which may be undesirable in some situations. A thin client is generally a device with a limited processor and a browser, and may not be desirable in situations where a slow network or traffic congestion is present. Further, a thin client has diminished presentation, and a web browser limits the ability to display graphics that take full advantage of the hardware. Thus, if game players suspect that a thin-client EGM is not behaving normally, then the players might move to another EGM.

In comparison to fat clients and thin clients, a smart client can download the presentation, and has the architecture as defined above where the game logic is separated from the presentation. The logic engine can remain on the back-end server 140, and the presentation is downloaded, with the presentation code able to run in a browser of the smart client. The presentation code could also be C++ code, for example, or any embedded technology coding optimized to take full advantage of the hardware and give the best presentation with audio and graphics. The separation architecture in this embodiment reduces the network bandwidth needed, since the outcome throughout is still distributed from the back-end server 140. Further, because the media or all the animation controlling game flow are not sent through the server 140 but are instead downloaded to the smart client, only requested game results travels over the network, thereby reducing the traffic on the network.

An embodiment of this smart client is adapted to download multiple different game presentation images and engines to its second processor 120. If only a number of the downloaded presentation engines may be presented for play at any one time, capability in the smart client may be provided to store the most popular game titles/engines.

In one embodiment, each presentation engine on the EGM is associated with a virtual EGM. At least one virtual EGM exists and has an accounting "bucket" for each of the presentation game engines present on a physical EGM, and virtual EGMs allow easier and effective game allocation among different EGMs. Where a player chooses to play an enabled game on an EGM, the accounting of that game is accounted for in its virtual EGM accounting bucket. In one embodiment, in order for a game to be played, its physical EGM has the game tied to a virtual EGM in the back-end server 140 at the time the game was installed on the EGM. Games may be added easily to an EGM at any time in one embodiment, but a game deletion can be configured to be more difficult. For example, games can be just disabled so that they are not available for play, with a game deletion configures to be a more lengthy process. To document the games played on an EGM over the lifetime of the EGM, an accounting system can be provided to document the game history for that EGM.

Figure 5:
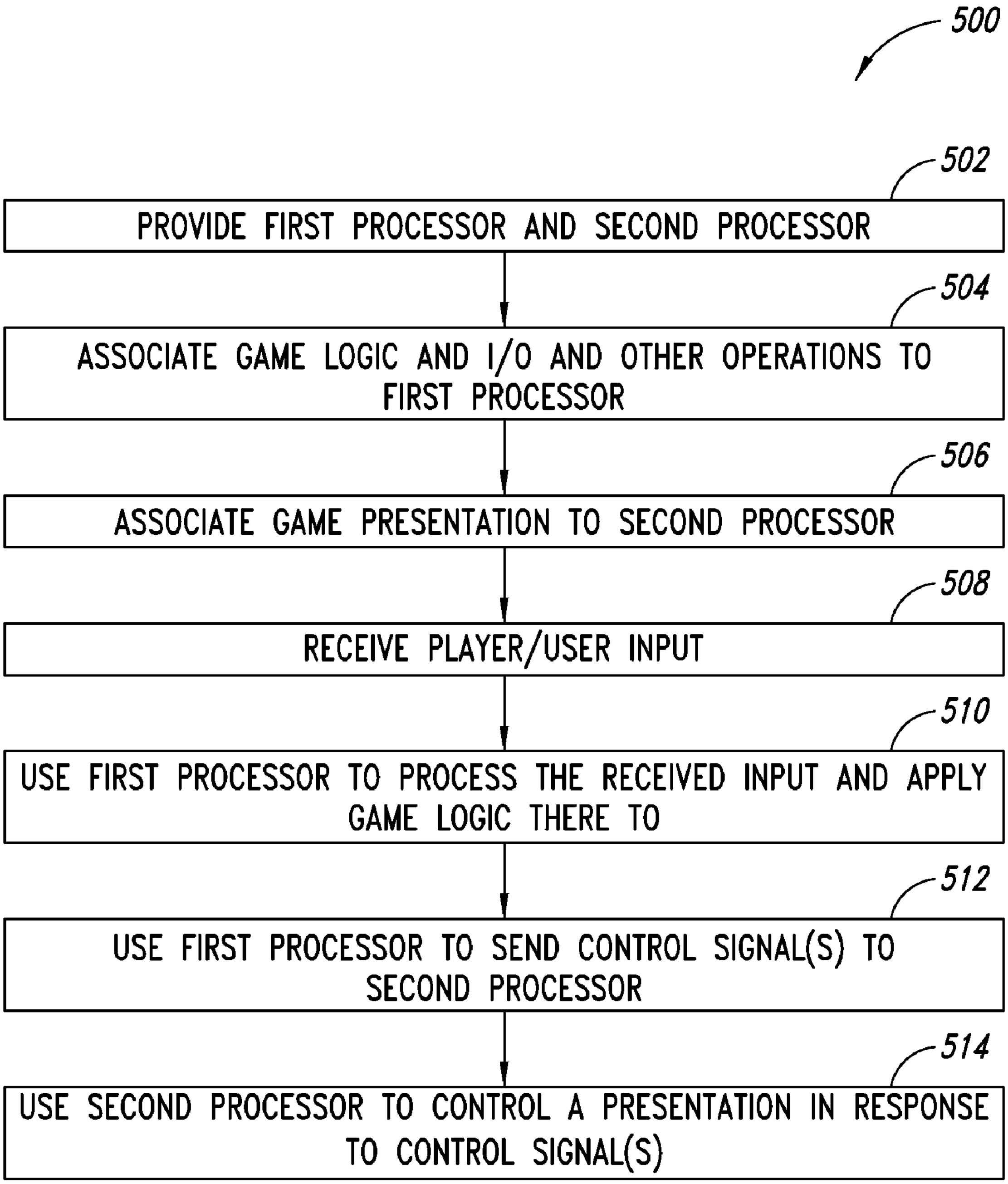
FIG. 5 is a flowchart of one embodiment of a method of operating a multi-processor architecture.

FIG. 5 is a flowchart of a method 500 to operate a multi-processor architecture, according to one embodiment. In one embodiment, at least some operations depicted in the method 500 can be implemented via software or other processor-executable instructions stored on a processor-readable storage medium (such as the hard disk 122, the flash 102, and/or any other processor-readable storage medium present at the EGM or at the back-end server 140 or the devices 150/152) and executable by the first processor 100 and/or by the second processor 120 and/or by a processor of the back-end server 140 and/or by the processors of the devices 150/152. Moreover, the various operations depicted in the method 500 need not necessarily occur in the exact order shown. Various operations can be added, removed, modified, or combined in certain embodiments.

At a block 502, a plurality of processors for the multi-processor architecture is provided. In one embodiment such as described above, the first processor 100 and the second processor 120 are provided. Both of the processors may be provided in an EGM; or in the case of server-based gaming the second processor 120 may be provided in the EGM or other client device, while the first processor 100 can be located at the server 140. In other SBG implementations, the first processor 100 can be located at the EGM or other client device, along with the second processor 120.

At a block 504, the game logic, I/O, and other operations are associated with the first processor 100 for its execution. As previously described above, such association can include having the first processor 100 designated to execute the game logic engine such that gaming operations and processing of player input will be controlled/managed by the first processor 100.

At a block 506, the game presentation (including presentation of multimedia content) is associated with the second processor 129 for execution. As previously described above, such association can include having the second processor 120 designated to execute the presentation engine such that presentation of game play output will be controlled/managed by the second processor 120.

According to the various embodiments previously described above, the presentation engine may be downloaded to the second processor 120 from the server 140, at the block 506, if the second processor needs to have the presentation engine installed therein in order to present content of a particular game. The logic engine can be located at the EGM or other client device, or at the server 140, depending on the particular implementation of server-based gaming or non-server-based gaming that is used.

At the blocks 504-506, allocation of tasks pertaining to presentation that are to be performed by the second processor 120, versus tasks pertaining to I/O and game logic that are to be performed by the first processor 100, can be configured programmatically in one embodiment, for example by having a system administrator configure or otherwise program the EGM (and/or server 140 and/or the devices 150 and 142) to designate which tasks are to be performed by the first processor 100 and by the second processor 120. This task allocation can be performed at a higher level, for example by having the system administrator designate which application programs (e.g., the game logic engine, a communications application program, etc.) are to be run entirely by the first processor 100, and which other application programs (e.g., the presentation engine, a video driver program, etc.) are to be run entirely by the second processor 120. In a more granular level of task allocations, certain tasks (which may comprise only a portion of the total functionality or total number of tasks of a particular application program) can be allocated to the first processor 100, while other tasks of the same application program can be allocated to the second processor 120. In a still further granular level of task allocation, even individual instructions or instruction sets can be allocated between the two processors.

At a block 508, user input is received, such as via the buttons 116 or other user input device of the EGM. Such user input may include, for example, a request from the player to play a game, user input during the course of game play, or other types of user input.

At a block 510, the first processor 100 is used to process the received user input and to apply the game logic to the user input, for example by executing the game logic engine to provide a game result based on the user input.

At a block 512, the first processor 100 sends one or more control signals to the second processor 120, via one or more communication lines between the first processor 100 and the second processor 120. Such control signal(s) may, for example, instruct the second processor 120 to display the game result. At the block 512, the first processor 100 may alternatively or additionally directly send control signals to the main display 132 to cause content to be displayed thereon, such as the content shown and described with respect to FIGS. 2-3 above.

At a block 514, the second processor 120 is used to provide/control a presentation on the main display 132 in response to the control signal(s) provided by the first processor 100. The second processor 120 of one embodiment executes the presentation engine in order to provide the game result for presentation on the main display 132.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in integrated circuits, as one or more programs executed by one or more processor cores, as one or more programs executed by one or more controllers (e.g., microcontrollers), as firmware, or as virtually any combination thereof.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a “processor-readable medium” can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), and a portable compact disc read-only memory (CDROM). Note that the processor-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operating a multi-processor architecture in an electronic gaming environment, the method comprising:

providing a first processor to execute a logic engine for a game, said first processor being located in a server;

providing a second processor to execute only a presentation engine for said game, said second processor being located in a client device remote from said server;

executing by said first processor said logic engine to process player input to obtain an outcome pertaining to said game;

sending, by said first processor to said second processor, a control signal that corresponds to said outcome;

executing, by said second processor in response to said control signal sent by said first processor, said presentation engine to present said outcome;

providing communication from said second processor to a display to enable said second processor to control presentation of said outcome within a first area of said display; and providing communication from said first processor to said display to enable said first processor to control presentation of content within a second area of said display concurrently with said presentation of said outcome within said first area, wherein said content is different from said outcome and said first area is different from said second area.

2. The method of claim 1, further comprising downloading said presentation engine from said server to said client device, wherein said executing said logic engine includes executing said logic engine at said server and wherein said executing said presentation engine includes executing said downloaded presentation engine at said client device.

3. The method of claim 1 wherein said first processor is also provided to execute tasks pertaining to input/output (I/O,) peripherals, communications, accounting, power hit tolerances, and protocols.

4. A multi-processor system in an electronic gaming environment, the system comprising:

a first processor configured to execute a logic engine for a game, said first processor being located in a server;

a second processor configured to execute only a presentation engine for said game, said second processor being located in a client device remote from said server;

a first processor-readable storage medium communicatively coupled to said first processor and that stores a first set of processor-executable instructions that implement said logic engine, said first set of processor-executable instructions being executable by said first processor to process player input to obtain an outcome pertaining to said game;

a communication line that communicatively couples said first and second processors and enables said first processor to provide a control signal to said second processor that corresponds to said outcome; and a second processor-readable storage medium communicatively coupled to said second processor and that stores a second set of processor-executable instructions that implement said presentation engine, said second set of processor-executable instructions being executable by said second processor to present content in a first area of a display communicatively coupled to the second processor and, in response to said control signal sent by said first processor, to present said outcome in a distinct second area of said display, said server being configured to download said second set of processor-executable instructions that implement said presentation engine to said client device to be executed at said client device, and wherein said first set of processor-executable instructions that implement said logic engine are executed at said server.

5. The system of claim 4, wherein said display is independently controllable by both said first and second processors.

6. The system of claim 4 wherein said second processor is located on a wireless client device.

7. An electronic gaming machine (EGM) apparatus, comprising:

at least one processor configured to execute only a presentation engine for a game, wherein another processor is configured to execute a logic engine for said game, said another processor being located at a server remote from said at least one processor;

a processor-readable storage medium communicatively coupled to said at least one processor and that stores a set of processor-executable instructions that implement said presentation engine, said set of processor-executable instructions being executable by said at least one processor to present an outcome pertaining to said game, in response to a control signal received from said another processor and generated by said another processor in response to application of said logic engine to player input; and a display communicatively coupled to said at least one processor and said another processor and configured to concurrently display a first type of information in a first portion of said display, the first type of information being received from said at least one processor, and a distinct second type of information in a distinct second portion of said display, the second type of information being received from said another processor.

8. The EGM apparatus of claim 7, further comprising another processor-readable storage medium communicatively coupled to said first processor and that stores a another set of processor-executable instructions that implement said logic engine, said first set of processor-executable instructions being executable by said first processor to process said player input to obtain said outcome pertaining to said game.

9. The EGM apparatus of claim 7 wherein said at least one processor is located in a wireless client device.

10. A server apparatus in an electronic gaming environment, the server comprising:

at least one processor configured to execute a game logic engine for a game and another processor configured to execute only a presentation engine for said game, said presentation engine downloaded by said at least one processor to a client device having said another processor so as to be executed at said client device and so as to present content in a first display area of said client device; and a processor-readable storage medium communicatively coupled to said at least one processor and storing a set of processor-executable instructions that implement said game logic engine, said set of processor-executable instructions being executable by said at least one processor to obtain an outcome pertaining to said game in response to player input, said at least one processor enabled to generate a control signal corresponding to said outcome and to send said control signal to said another processor to enable said another processor to execute said presentation engine to present said outcome in a distinct second display area of said client device.

11. The server apparatus of claim 10 wherein said client device includes a wireless device.

12. The server apparatus of claim 10 wherein said game logic engine is shared by a plurality of remote client devices, each having a respective said another processor configured to execute respective said presentation engine.

* * * * *